United States Patent [19]

Hähnke et al.

[11] Patent Number: 4,563,191

[45] Date of Patent: Jan. 7, 1986

[54] PROCESS FOR DYEING, IN THE GEL STATE, FIBER MATERIAL COMPOSED OF WET SPUN ACRYLONITRILE POLYMERS USING DYES WITH TWO BASIC GROUPS

[75] Inventors: Manfred Hähnke, Kelkheim; Reinhard Mohr, Offenbach am Main; Kurt Hohmann, Neu-Isenburg, all of Fed. Rep. of Germany

[73] Assignee: Hoechst Aktiengesellschaft, Frankfurt am Main, Fed. Rep. of Germany

[21] Appl. No.: 647,269

[22] Filed: Sep. 4, 1984

Related U.S. Application Data

[63] Continuation of Ser. No. 571,151, Jan. 17, 1984, abandoned, which is a continuation of Ser. No. 491,780, May 9, 1983, abandoned, which is a continuation of Ser. No. 388,933, Jun. 16, 1982, abandoned, which is a continuation of Ser. No. 283,351, Jul. 14, 1981, abandoned.

[30] Foreign Application Priority Data

Jul. 16, 1980 [DE] Fed. Rep. of Germany ....... 3026948

[51] Int. Cl.$^4$ .......................... D01F 6/18; D06F 1/06; D06P 1/41; C09B 23/16
[52] U.S. Cl. ............................................ 8/538; 8/654; 8/655; 8/657; 8/659; 8/539; 8/927; 264/78
[58] Field of Search .................... 8/538, 654, 657, 655

[56] References Cited

U.S. PATENT DOCUMENTS

| | | | |
|---|---|---|---|
| 3,086,003 | 4/1963 | Baumann et al. | 8/655 |
| 3,104,932 | 9/1963 | Horn et al. | 8/657 |
| 3,647,483 | 9/1969 | Bugaut et al. | 8/426 |
| 3,700,398 | 10/1972 | Cole | 8/531 |
| 3,787,182 | 1/1974 | Eigenmann et al. | 8/538 |
| 3,904,660 | 9/1975 | Doss | 8/654 |
| 3,919,214 | 11/1975 | Leverenz et al. | 8/539 |
| 3,966,405 | 6/1976 | Mohr et al. | 8/539 |
| 4,123,222 | 10/1978 | Loew | 8/654 |
| 4,266,940 | 5/1981 | Blackburn et al. | 8/538 |
| 4,336,377 | 6/1982 | Adam et al. | 8/655 |
| 4,344,879 | 8/1982 | Mohr et al. | 534/751 |

FOREIGN PATENT DOCUMENTS

| | | |
|---|---|---|
| 2823169 | 11/1979 | Fed. Rep. of Germany . |
| 2822912 | 11/1979 | Fed. Rep. of Germany . |
| 2945028 | 5/1981 | Fed. Rep. of Germany . |
| 673738 | 6/1952 | United Kingdom . |
| 884885 | 12/1961 | United Kingdom . |
| 910121 | 11/1962 | United Kingdom . |
| 1257652 | 12/1971 | United Kingdom . |
| 1335997 | 10/1973 | United Kingdom . |
| 1364952 | 8/1974 | United Kingdom . |
| 1483311 | 8/1977 | United Kingdom . |
| 2017156 | 10/1979 | United Kingdom . |
| 2022099 | 12/1979 | United Kingdom . |
| 1568767 | 6/1980 | United Kingdom . |
| 2048963 | 12/1980 | United Kingdom . |

OTHER PUBLICATIONS

K. Venkataraman, "The Chemistry of Synthetic Dyes", vol. IV (1971), Chapt. VI, p. 208.

*Primary Examiner*—A. Lionel Clingman
*Attorney, Agent, or Firm*—Curtis, Morris & Safford

[57] ABSTRACT

Fiber material composed of acid-modified homopolymers or copolymers of acrylonitrile (PAC fibers) which has been obtained by a wet spinning process, has not been dried and is still in a swollen condition (gel form), can be dyed advantageously and in fast colors by means of soluble dyes, the molecule of which contains several groups, namely more than one quaternary grouping and/or a strongly basic grouping carrying no charge, which exert a basic action towards the acid groups of the fiber substance. The chromophore of this colorant can belong to the category of monoazo or diazo dyes, methine, azamethine or diazamethine dyes or naphthalactam dyes.

In accordance with the invention, after substantially removing the non-aqueous spinning solvent by washing, the spun material, as a moist gel, is dyed continuously or discontinuously from an aqueous dyebath; the fibers can be stretched before the dye is applied, during the dyeing process itself or immediately afterwards.

By virtue of their special nature, the dyes of the type designated above, which have a strong fixing action, produce optimum fixing rates when dyeing PAC gels and, in the subsequent production stages, do not cause any noticeable soiling, as a result of dye which has bled out, on components of machines and operating baths, such as stretching or after-treatment baths. Investigations of penetration of the fiber by the dye, of the fixing rate and of the resulting fastness properties, such as fastness to wet processing, have shown no disadvantages compared with conventional dyes.

19 Claims, No Drawings

PROCESS FOR DYEING, IN THE GEL STATE, FIBER MATERIAL COMPOSED OF WET SPUN ACRYLONITRILE POLYMERS USING DYES WITH TWO BASIC GROUPS

This application is a continuation of application Ser. No. 571,151 filed Jan. 17, 1984 which was a continuation of application Ser. No. 491,780 filed May 9, 1983 which was a continuation of application Ser. No. 388,933 filed June 16, 1982 which was a continuation of application Ser. No. 283,351 filed July 14, 1981, all are now abandoned.

The present invention relates to dyeing, in the course of the manufacturing process and in the gel state, after removing the bulk of the non-aqueous spinning solvent and, if appropriate, before the final stretching process, fiber material produced by a conventional wet spinning process, such as slivers or filaments, composed of acid-modified polymers or copolymers of acrylonitrile, using aqueous solutions of dyestuffs which exhibit a basic behavior towards the acid groups of the fiber substance.

Various processes have already been described for producing, as part of the spinning and stretching process, continuously dyed, wet spun acrylic fibers. Thus wet spun acrylic filaments are dyed after washing, before or after stretching, provided that they are still in a swollen and not dried state (French Patent Specification No. 980,700; Japanese Patent Publication No. 24,495/69; and U.S. Pat. No. 3,113,827). Other publications (Czechoslovak Patent Specification No. 104,915; U.S. Pat. No. 3,111,357; and British Patent Specification No. 991,957) illustrate the dyeing of wet spun acrylic filaments during the stretching process, the absorption of dye being greater, the more highly the filaments are stretched. Particularly rapid dyeing of wet spun acrylic fibers can be achieved if the dye is added direct to the coagulation bath, because the dye can then penetrate immediately into the fiber which is being formed, which still has a loose structure (U.S. Pat. No. 3,242,243 and Czechoslovak Patent Specification No. 95,939). This immediate extrusion of acrylic fibers into a dyebath is known in the art as "Neochrome dyeing" (Man-Made Textiles, August 1966, page 58).

However, maintaining the concentration of dye constant during the dyeing process is a great problem in continuous gel dyeing of this type. This is because the moisture content of the slivers and/or filaments entrains water continuously into the liquor and thus reduces the concentration of the dye solution correspondingly. This causes unevenness in the appearance of the dyeing produced by such means.

A further difficulty in dyeing wet spun acrylic fibers in the gel state is that of achieving good fastness properties. Although rapid and, in part, deep dyeing is produced as a result of diffusion processes when conventional basic dyes are employed, if fairly high proportions of solvents or spinning bath liquid are present in the spun material, fibers and filaments which have been dyed in this manner exhibit a tendency to bleed considerably in the subsequent making-up processes, for example in the steaming, washing and finishing processes and also in the stretching process.

However, this result means a loss of depth of color for the polymer to be dyed and, in addition, also means a tailing of the shade along the running spun filaments, if stretching, washing and after-treatment baths which are as yet devoid of dyes, but which contain cationic or anionic softeners, are present at the start of a dyeing. This is because these baths, under the conditions mentioned, have a tendency to become enriched in dye during the further production. In addition, when using the strongly bleeding dyes hitherto customary, a not inconsiderable soiling of the machines can be observed, which is a particular problem if the dyeing operation is changed over to another shade.

A known factor in all dyeing processes on the basis mentioned above is the use of basic dyes containing only one single quaternary group or only one single aliphatically linked, primary, secondary or tertiary amino, guanidino or hydrazino group.

It is the purpose and object of the present invention to eliminate the problems connected with gel dyeing which have been indicated, to remove the drawbacks described and to improve the inadequate fixing properties which result from the existing dyeings.

This object is achieved in accordance with the invention by using, for the gel dyeing of the acrylic fibers defined initially in greater detail, dyes in which the molecule contains more than one group which exhibits a basic behavior towards the acid groups of the fiber substance.

These days, which are accepted as usable, can be employed, in the process claimed, either as individual dyes or for combination dyeing. They are distinguished by rapid and strong fixation in the polymer, so that the disadvantages associated with the conventional procedure can no longer arise. Filaments which are dyed evenly and in depth right through the entire cross-section of the fiber are produced even within short dyeing times.

The groups previously described, which are regarded as a characteristic feature of the dyes considered under the heading of the present invention can be of an identical type or can also be different from one another. The groups of this type, in the molecule of the selected dyes, which exhibit a basic behavior towards the acid groups of the fiber substance, are, individually, more than one quaternary group, or one quaternary group and, in addition, one or more aliphatically linked, primary, secondary or tertiary amino, guanidino, amidino or hydrazino group, or more than one aliphatically linked, primary, secondary of tertiary amino, guanidino, amidino or hydrazino group.

Basic dyes of this type which have been found to be suitable in accordance with the process by virtue of the presence of quaternary groups in their molecule, represent compounds of a salt-like structure and are composed of a dye cation $F^{(+)}$, which constitutes the chromophoric constituent and which amounts, in relative terms, to the larger part of the molecule (higher weight of cation) in comparison with the dye anion $X^{(-)}$, which is mainly responsible for the solubility of the product.

Examples of suitable quaternary groups for basic dyes of this type are ammonium groups, such as, for example, a trialkylammonium group containing lower alkyl radicals which can optionally be substituted, also an N,N-dialkyl-N-arylammonium group containing optionally substituted lower alkyl radicals, an N,N-dialkyl-N-aralkylammonium group containing lower, optionally substituted alkyl groups, and an N-monoalkyl-N-aryl-N-aralkylammonium group containing a lower, optionally substituted alkyl group; these ammonium groups are linked to the aromatic part of the chromophoric system, such as, for example, a benzene or naphthalene nucleus, either direct or via an aliphatic radical which optionally contains hetero-atoms and/or small organic groupings as a bridge member; if several substituents belonging to the same category are present on the same nitrogen atom in these ammonium groups, these substituents can either be identical or different from one another.

Quaternary groups in the dyes which can be used in accordance with the invention are also lower dialkylhydrazonium groups and cyclammonium radicals, preferably having an aromatic character, in particular mesomeric 5-membered or 6-membered, positively charged rings which can also contain further hetero-atoms, such as oxygen, sulfur and/or nitrogen atoms.

These cyclammonium radicals can be a constituent of the chromophoric system or can be directly linked to an aromatic, carbocyclic radical, such as a benzene or naphthalene nucleus, or can be fused to the latter. Examples of cyclammonium radicals and derivatives thereof are pyridinium, pyrazolium, imidazolium, triazolium, tetrazolium, oxazolium, thiazolium, isothiazolium, oxdiazolium, thiadiazolium, isothiadiazolium, quinolinium, indolium, indazolium, benzimidazolium, benztriazolium, benzisothiazolium, benzthiazolium, arylguanazolium or benzoxazolium radicals, it being possible for these radicals to be substituted in the heterocyclic structures, preferably, by lower, optionally substituted alkyl radicals or by aralkyl, aryl and/or cycloalkyl radicals, and for them to be substituted in the aromatic, carbocyclic parts by quaternary groups, such as, for example, those mentioned above, or by other basic and/or nonionic groups; examples of such basic groups (without a quaternary charge) are primary, secondary or tertiary amino groups, hydrazino groups, guanidino groups or amidino groups, and also heterocyclic, nitrogen-containing rings, such as, for example, the pyridine, imidazole, morpholine, piperidine or piperazine ring, and examples of nonionic groups are halogen atoms, such as chlorine or bromine atoms, lower, optionally substituted alkyl groups, lower alkoxy groups, the nitro group, the sulfamoyl or carbamoyl group, a sulfamoyl or carbamoyl group which is substituted by lower alkyl, phenyl and/or benzyl, a lower carboalkoxy group, a lower alkylsulfonyl group and a lower alkanoylamino group, the benzoylamino group, the trifluoromethyl group and the cyano group.

In the preceding and subsequent text, terms have the following meanings: the term "lower" denotes that the alkyl, alkylene or alkoxy radical characterized in greater detail by this specification is composed of 1–4 C atoms; the term "substituted alkyl radical" denotes that the alkyl is substituted by 1 or 2, preferably 1, of the same or different substituents belonging to the group comprising hydroxyl, acetoxy, lower alkoxy, cyano, lower carboalkoxy, such as carbomethoxy and carboethoxy, chlorine, phenyl and carbamoyl, it being additionally possible for the phenyl itself also to be substituted by halogen, such as chlorine, bromine or fluorine, lower alkyl, lower alkoxy, nitro, acetylamino, sulfamoyl and/or carbamoyl, and for the carbamoyl, for its part, also to be monosubstituted or disubstituted by lower alkyl, a phenyl group or a benzyl radical; an example of an alkyl radical which is substituted in this sense is, therefore, a $\beta$-hydroxyethyl, $\beta$-cyanoethyl, $\beta$-acetoxyethyl, $\gamma$-hydroxypropyl, $\gamma$-methoxyethyl, benzyl or phenethyl group; the term "aryl" denotes an aryl radical, in particular a phenyl or naphthyl radical, which can also be substituted by the quaternary, basic or nonionic groups indicated above; nonionic substituents, 1 to 3 of which can preferably be present in the aryl radical, are, in particular, halogen, such as chlorine or bromine, lower alkyl, such as methyl or ethyl, lower alkoxy, such as methoxy, ethoxy or propoxy, nitro, lower alkylsulfonyl and trifluoromethyl; the term "aralkyl" denotes a lower alkyl radical which is substituted by an aryl radical, the aryl radical having the above-mentioned meaning; the aryl radical in "aralkyl" is preferably a phenyl radical which can be substituted by 1 or 2 substituents belonging to the group comprising lower alkyl, lower alkoxy and chlorine; and the term "cycloalkyl" denotes a cycloalkyl radical having 4–12 ring C atoms, such as the cyclopentyl or cyclohexyl radical, which can also be substituted by 1–3 lower alkyl groups, such as methyl groups.

Lower alkyl groups (alkyl radicals) are, in particular, the methyl and ethyl groups, lower alkoxy groups are, in particular, the methoxy and ethoxy groups, and aralkyl radicals are, in particular, the benzyl and phenethyl groups.

Preferred (quaternary) ammonium groups which should be mentioned are the trimethylammonium group, the triethylammonium group, the dimethylethylammonium group, the benzyldimethylammonium group and the phenyldimethylammonium group.

Lower, substituted alkyl radicals, which are linked by the alkyl to a nitrogen atom, are preferably alkyl groups which have 1–4 C atoms and which are substituted by a hydroxyl, lower alkoxy, cyano or phenyl group, such as, for example, the $\beta$-hydroxyethyl, $\beta$-cyanoethyl, $\beta$-methoxyethyl, benzyl or phenethyl group.

The basic dyes of a quaternary character which can be used in accordance with the present invention contain, as the anion $X^{(-)}$, preferably the anion of a strong inorganic or organic acid, such as the anion of sulfuric acid or (lower alkyl) half-esters thhereof (=lower alkosulfate), hydrochloric acid, phosphoric acid, perchloric acid, tetrafluoboric acid, thiocyanic acid, acetic acid, chloroacetic acid, trichloroacetic acid, formic acid, oxalic acid, lactic acid, propionic acid or malonic acid. It is also possible for the dyes to be present as chlorides in the form of their double salts with zinc chloride. The nature of the anion is of no importance for the tinctorial properties of the dyes used in accordance with the invention, provided that it is a colorless anion. Dyeings having a particularly great depth of color are achieved with dyes wherein the anion weight amounts to a small proportion. In addition, the anion should be chosen so that the resulting dye salt is watersoluble.

In particular, $X^{(-)}$ denotes the equivalent of the sulfate, phosphate, oxalate or tetrachlorozincate anion; or the chloride, bromide, tetrafluoborate, thiocyanate, acetate, monochloroacetate, trichloroacetate or trichlorozincate anion or the alkosulfate anion containing a lower alkyl group, such as the methosulfate or ethosulfate anion.

Amongst the dyes which can be used in accordance with the invention, such quaternary dyestuffs should be emphasized in which the cationic charge is delocalized, which can be expressed in terms of a formula by different mesomeric limiting structures.

The process claimed is also particularly advantageous when applying dyes considered qualified for the present invention which further contain, besides the quaternary group(s), one or more other strongly basic groups. Examples of strongly basic groups of this type (without a quaternary charge) are primary, secondary or tertiary amino groups which are linked to the dye chromophore via an aliphatic radical which optionally contains hetero-atoms and/or small organic groupings as a bridge member, and also hydrazino, guanidino or amidino groups; the amino groups can also form part of a heterocyclic ring, for example part of the pyridine, imidazole, morpholine, piperidine or piperazine ring. Secondary amino groups are preferably lower monoalkylamino groups, arylamino groups or aralkylamino groups, such as, for example, the methylamino, ethylamino or isopropylamino group or the phenylamino group or the p-methylphenylamino group. Examples of tertiary amino groups are the dimethylamino, diethylamino, N-methylanilino, N-ethylanilino or N-methylbenzylamino group.

Examples of hetero-atoms and fairly small organic groupings which have been mentioned above and earlier in the text as a bridge member and via which the amino or ammonium groups can be attached to an aromatic ring of the dye molecule by means of aliphatic radicals, are groups of the formulae —O—, —NH—, —N(lower alkyl)—, —CO— or —SO$_2$—; examples of the aliphatic chains, for their part, are —CH$_2$—, —CH$_2$—CH$_2$—, —CH$_2$—CH$_2$—CH$_2$— or —CH$_2$—CH(OH)—CH$_2$—; and combinations thereof with one another and amongst one another, such as, in particular, also those which are evident from the examples.

Dyes which themselves do not contain a quaternary group, but which perhaps contain more than one strongly basic group (without a quaternary charge) of the type illustrated above, attached (as above) to the dye chromophore via an aliphatic intermediate member, can also be employed in the new dyeing process.

The basic dyes which are employed in accordance with the invention and which become fixed in the polymer strongly and rapidly, can belong to a very wide variety of classes of dye; in particular to the class of monoazo dyes, disazo dyes, methine, azamethine and diazamethine dyes and naphthalactam dyes.

Amongst the basic monoazo dyes which can be used in accordance with the invention, special mention should be made of the dyes of the general formula (1)

or 2 $X^{(-)}$, if K contains a quaternary group, in which $D^{(+)}$ denotes the radical of an aromatic, carbocyclic or heterocyclic diazo component which contains one of the abovementioned quaternary groups, $D^{(+)}$ representing, in particular, a pyrazolium, triazolium, thiazolium, thiadiazolium, indazolium, benztriazolium, benzimidazolium, benzthiazolium or benzisothiazolium radical and it being possible, as described initially, for these cyclammonium groups, and also the aromatic, carboxyclic radical which is optionally fused to them, to be substituted, or $D^{(+)}$ is an aromatic, carbocyclic or heterocyclic radical which has a (quaternary) ammonium group linked to it directly or linked to it, as mentioned above, for example, via a bridge member, such as, in particular, a trialkylammonium or dialkylhydrazonium group, these aromatic radicals being, in particular, radicals of benzene, naphthalene and benzthiazole; K represents the radical of an aromatic, carbocyclic or heterocyclic coupling component, in particular one belonging to the benzene, naphthalene or indole series, preferably belonging to the N,N-dialkylaminobenzene, the N,N-dialkylaminonaphthalene, the N-alkyl-N-aralkylaminobenzene, the N-alkyl-N-aralkylaminonaphthalene, the N,N-bis-(aralkyl)-aminobenzene, the N,N-bis-(aralkyl)-aminonaphthalene, the N-alkyl-N-arylaminobenzene and the N-alkylindole series, it being possible for the aromatic, carbocyclic radicals of the coupling component K to be substituted, preferably, by 1, 2 or 3 substituents belonging to the group comprising lower alkanoylamino, benzoylamino, lower alkyl, lower alkoxy, nitro, hydroxyl, amino, lower alkylamino, lower dialkylamino, chlorine and trifluoromethyl. This radical of the coupling component K contains, in turn, attached to the aromatic nucleus directly or via a bridge member (as mentioned above, for example) at least one aliphatically linked, primary, secondary or tertiary amino group or a (quaternary) ammonium group, which can optionally be a constituent of a 5-membered or 6-membered, aromatic, heterocyclic ring (for example a cyclammonium radical), or of an amidine, guanidine or hydrazine or of a thiuronium radical; these basic radicals are preferably linked via the alkyl radical of a lower N-alkylamino group (bridge member) as a substituent on the aromatic nucleus of K, while, if appropriate, a second lower N-alkylamino group present there can be substituted in the alkyl radical by chlorine, hydroxyl, lower alkoxy, aryloxy, cyano, acylamino, such as lower alkanoylamino or benzoylamino, or lower carboalkoxy; and $X^{(-)}$ as the equivalent of an anion, has the meaning indicated earlier in the text.

Amongst the basic monoazo dyes which can be used in accordance with the invention, preferential mention should also be made of those of the general formulae (2a), (2b) and (2c)

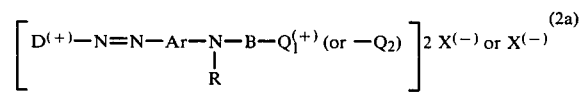

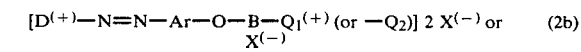

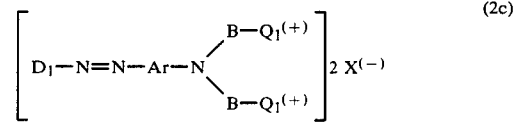

in which the individual formulae are defined as follows: $D^{(+)}$ as indicated above; $D_1$ is the radical of an aromatic, carbocyclic or heterocyclic diazo component which belongs, in particular, to the benzene or naphthalene series and which can contain the abovementioned basic substituents (without a quaternary charge) and/or nonionic substituents, $D_1$ being preferably the phenyl or naphthalene radical which can be substituted by 1–3 substituents belonging to the group comprising lower alkyl, lower alkoxy, fluorine, chlorine, bromine, lower alkanoylamino, benzoylamino, nitro, cyano, lower alkylsulfonyl, phenylsulfonyl, trifluoromethyl, carbamoyl, sulfamoyl, or carbamoyl or sulfamoyl which is substituted by lower alkyl, phenyl and/or benzyl, and lower carboalkoxy; Ar is a p-phenylene or 1,4-naphthylene radical which can be substituted by 1 or 2 substituents belonging to the group comprising lower alkyl, such as methyl or ethyl, lower alkoxy, such as methoxy or ethoxy, halogen, such as chlorine or bromine, nitro, lower alkanoylamino, such as acetylamino, and trifluoromethyl; R is hydrogen atom or a lower, optionally substituted alkyl radical, an aralkyl radical or a cycloalkyl radical; B represents a bivalent aliphatic bridge member, in particular an alkylene radical having 1–6 C atoms, preferably 2-4 C atoms, primarily the ethylene or propylene radical, or a lower alkenylene radical, such as the vinylene radical, it being possible for an alkylene bridge member B of this type to be substituted in its turn or to be linked via fairly small organic groupings, such as —CO—, —O—CO—, phenoxy or —SO$_2$—, to the nitrogen atom of the arylamino group or to $Q_1^{(+)}$ or $Q_2$; $Q_1^{(+)}$ is a (quaternary) ammonium group, in particular a lower trialkylammonium, lower N,N-dialkyl-N-aryl- or N-aralkylammonium or lower dialkylhydrazonium group or a cyclammonium radical, and as a special case of the latter, a pyridinium or imidazolium radical of the above meaning, the alkyl radicals on the nitrogen atom being optionally substituted; $Q_2$ represents a primary, secondary or tertiary amino group which can be a substituent of a 5-membered or 6-membered, aromatic, heterocyclic ring, or an amidino, guanidino or hydrazino group or preferably dialkylamino groups which can be substituted in the alkyl radical; and $X^{(-)}$ has the above-mentioned meaning.

Amongst the basic disazo dyes which can be used in accordance with the invention, particular mention should be made of those of the general formulae (3a) and (3b)

heterocyclic ring, and the heterocyclic and/or carbocyclic parts are optionally substituted; $D_2$ is an aliphatic or aromatic, carbocylic or aromatic, heterocyclic bridge member or a bridge member consisting of simple groupings of atoms, for example a bridge member of the formulae —CH$_2$—, —CH$_2$CH$_2$—, —O—CH$_2$—CH$_2$—O—, —CH=CH—, —NH—, —O—, —S—, —SO$_2$—, —N=N—, —NH—CO—NH—, —CO—NH— or —NH—CO—, or the radical of the formula

or a cyclohexylene radical or a heterocyclic radical, for example a radical of the formulae

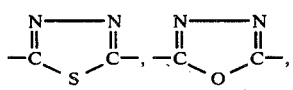

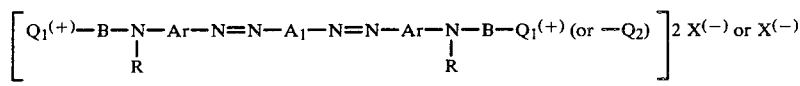

(3a)

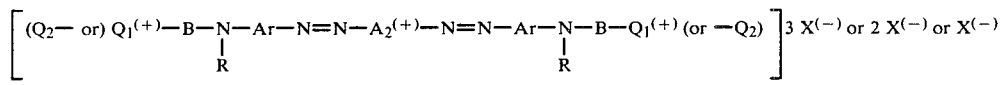

(3b)

in which Ar, B, R, $Q_1^{(+)}$, $Q_2$ and $X^{(-)}$ have the meanings mentioned for formula (1) or (2), it being possible for the formulae which occur twice in each of the formulae (3) to be identical or different from one another in each case; $A_1$ denotes the radical of an aromatic, carbocyclic or aromatic, heterocyclic tetrazo component, and particularly the phenylene radical, the naphthalene radical or the diphenylene radical or one of the radicals of the formulae

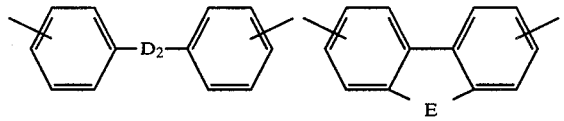

it being possible for the aromatic nuclei in the members listed above and also in these two formulae to be substituted by substituents, preferably 1 or 2 substituents, belonging to the group comprising lower alkyl, such as methyl, lower alkoxy, such as methoxy, and chlorine; $A_2^{(+)}$ represents the radical of an aromatic, carbocyclic or aromatic, heterocyclic tetrazo component containing at least one (quaternary) ammonium group, in particular, as a constituent of a 5-membered or 6-membered

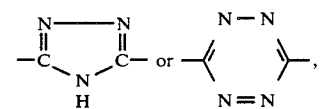

but is preferably a bridge member of the formula —CH$_2$—, —CH$_2$—CH$_2$—, —CH=CH—, —NH—, —SO$_2$—, —CO—NH— or —NH—CO—; and E represents a bivalent bridge member of the formula —O—, —S—, —NH— or —SO$_2$—.

In the disazo dyes, previously mentioned, according to the general formulae (3a) and (3b), the radicals $Q_1^{(+)}$ and $Q_2$—both together or each individually on its own—can also be linked to the arylene radical Ar appropriate in each case either direct or merely via the bridge member B, in which case, however, the selection rule then applicable is that a radical $Q_2$ which may be present in formula (3a) cannot be linked directly to Ar and that, in accordance with formula (3b), if there are two radicals $Q_2$ linked directly to the Ar's on each side, the radical of the tetrazo component $A_2^{(+)}$ must contain more than one (quaternary) ammonium grouping.

Among the basic disazo dyes which can be used in accordance with the invention, special mention should also be made of those of the general formulae (4a) and (4b)

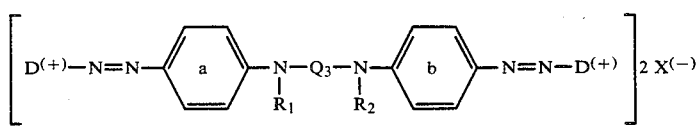

(4a)

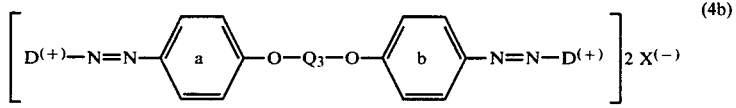
(4b)

in which the D$^{(+)}$s are identical or different and each has the meaning mentioned above; Q$_3$ denotes a lower alkylene group, such as, for example, an ethylene or propylene group, a lower alkyleneoxyalkylene group, such as, for example, an ethyleneoxyethylene group, or a lower alkyleneaminoalkylene group, such as a diethyleneamino group, or is an alkylene group which has 2 to 8 C atoms and which is interrupted by two amino groups or oxygen atoms, such as a dioxytriethylene group, or is a lower alkylene group which is optionally substituted or can be interrupted by an aromatic, carbocyclic radical, such as a benzene nucleus or napthalene nucleus, for example by the m-xylylene or p-xylylene radical, or by —O—CO—, —N(alkyl)— or —N(-phenyl)—; R$_1$ and R$_2$ are identical or different and each represents a hydrogen atom or a lower, optionally substituted alkyl group, or R$_1$ and R$_2$, together with the two nitrogen atoms and the radical Q$_3$, form a heterocyclic ring, such as, for example, a piperazine ring; the benzene nuclei a and b can each have one or two identical or different substituents belonging to the group comprising lower alkyl, lower alkoxy, halogen, trifluoromethyl and lower alkanoylamino, or the nuclei a or b or both of them, together with a fused benzene nucleus, can each form a naphthalene radical; and X$^{(-)}$ has the above-mentioned meaning.

Among the basic methine dyes which can be used in accordance with the invention, those which should be singled out particularly have the general formula (5)

radical, for example the benzyl or phenethyl radical; and the two U's are identical or different and each represents a hydrogen atom, a halogen atom, such as a chlorine or bromine atom, a lower alkyl group, such as a methyl or ethyl group, a lower alkoxy group, such as a methoxy or ethoxy group, a nitro group, an aryloxy group, such as a phenoxy group, an aralkoxy group, such as a benzyloxy or phenethoxy group, or a lower carboalkoxy group, such as a carbomethoxy or carboethoxy group.

Basic dyes which can be used in accordance with the invention and which should be singled out particularly are azamethine dyes of the formula (6)

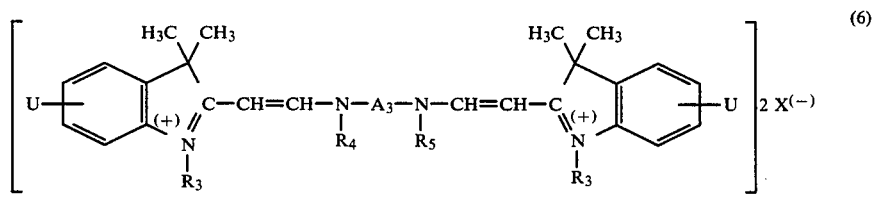
(6)

and diazamethine dyes of the formula (7)

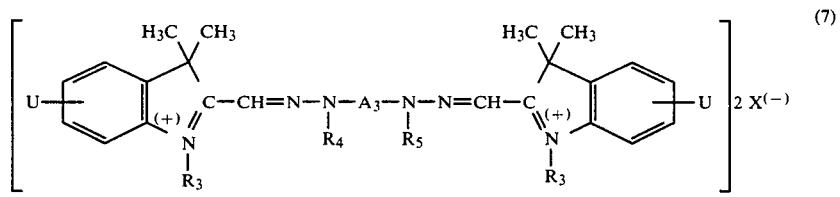
(7)

in which R$_3$, U and X$^{(-)}$ have the meanings mentioned above; R$_4$ and R$_5$ are identical or different and each is a hydrogen atom or a lower, optionally substituted alkyl group; and A$_3$ denotes a bivalent radical which can be composed of one or more aromatic, carbocyclic or heterocyclic nuclei which can also be linked to one another by nonaromatic bridge members.

The bivalent radical A$_3$ is, for example, the bivalent radical of benzene, naphthalene, diphenyl, glycol diphenyl ether, diglycol diphenyl ether, a lower diphenylalkane, diphenyl ether, diphenyl sulfide, diphenyl sulfone, diphenyl ketone, azobenzene and diphenylurea, it being also possible for each of the benzene nuclei in these radicals to be substituted by 1 or 2 substituents, preferably substituents belonging to the group compris-

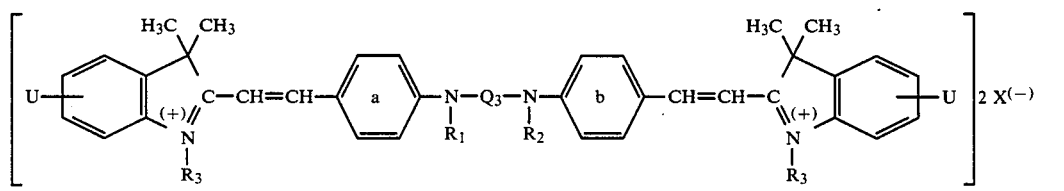
(5)

in which R$_1$, R$_2$, Q$_3$, X$^{(-)}$ and the benzene nuclei a and b have the meanings mentioned above; R$_3$ denotes a lower, optionally substituted alkyl radical or an aralkyl ing lower alkyl, lower alkoxy, halogen, such as bromine and, particularly, chlorine, carbamoyl and sulfamoyl, or $A_3$ is, for example, the bivalent radical of 2-phenylbenzimidazole, 2-phenylbenzthiazole, 2-phenylbenzoxazole or diphenyloxadiazole, it being also possible for the heterocyclic ring to be substituted by lower alkyl groups, or $A_3$ is the bivalent radical of the formula

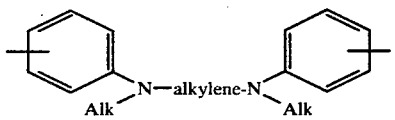

in which Alk denotes a lower alkyl radical and alkylene represents a straight-chain or branched alkylene bridge member.

The process according to the invention is carried out particularly advantageously when using bis-quaternary dyes, particularly bis-quaternary disazo dyes, of the general formula (4a) in which the $D^{(+)}$s are identical or different and each represents a triazolium, benzthiazolium or thiazolium radical which has been mentioned earlier in the text, $Q_3$ is an alkylene group having 2 to 4 C atoms, $R_1$ and $R_2$ are identical or different and each represents a lower, optionally substituted alkyl group or preferably a hydrogen atom, and the benzene nuclei a and b and also $X^{(-)}$ have the abovementioned meanings, and also when using bis-quaternary methine, azamethine and diazamethine dyes of the general formulae (5), (6) and (7) in which $Q_3$, $R_1$, $R_2$, a and b and also $X^{(-)}$ have the meanings which have just been mentioned previously, and $A_3$, $R_3$, $R_4$, $R_5$ and U have the meanings indicated for the formulae (5), (6) and (7).

The process according to the present invention can also be carried out by using methine compounds of the general formula (8)

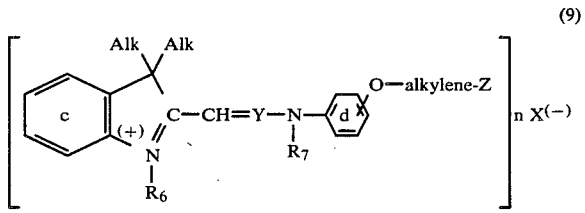

in which Ar, B, R, $R_3$, $Q_1^{(+)}$, $Q_2$, U and $X^{(-)}$ have the meanings mentioned above.

Azamethine and diazamethine compounds of the general formula (9)

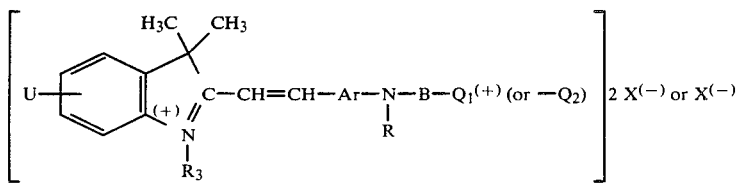

should also be mentioned particularly as dyes which can be used in accordance with the invention. In the formula (9), the symbols have the following meanings: $R_6$ is an alkyl group which has 1 to 4 C atoms and which can be substituted, for example by a carbamoyl group ($-CONH_2$), an alkanoyloxy group having 1 to 4 C atoms, a carboalkoxy group having 1 to 4 C atoms in the alkyl radical, or a hydroxyl, cyano or phenyl group; Alk is an alkyl group having 1 to 4 C atoms, it being possible for the two groups to be identical or different from one another; Y is the methine radical (CH) or a nitrogen atom; $R_7$ is a hydrogen atom or an alkyl group which has 1 to 4 C atoms and which can be substituted, for example by a carbamoyl group, an alkanoyloxy group having 1 to 4 C atoms, a carboalkoxy group having 1 to 4 C atoms in the alkyl radical, or a hydroxyl, cyano or phenyl group; alkylene is a straight-chain or branched alkylene group having 2 to 6 C atoms; Z is a group of the formula (9a) or (9b)

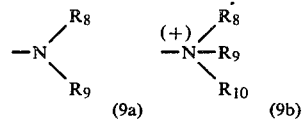

in which $R_8$ is an alkyl group which has 1 to 4 C atoms and which can be substituted, for example by a carbamoyl group, an alkanoyloxy group having 1 to 4 C atoms, a carboalkoxy group having 1 to 4 C atoms in the alkyl radical, or a hydroxyl, cyano or phenyl group; $R_9$ is an alkyl group which has 1 to 4 C atoms and which can be substituted, for example by a carbamoyl group, an alkanoyloxy group having 1 to 4 C atoms, a carboalkoxy group having 1 to 4 C atoms in the alkyl radical, or a hydroxyl, cyano or phenyl group, or $R_9$ is a phenyl radical which can be substituted by 1 or 2 substituents belonging to the group comprising chlorine, alkyl having 1 to 4 C atoms, alkoxy having 1 to 4 C atoms, nitro, carboalkoxy having 1 to 4 C atoms in the alkyl radical and carbamoyl; and $R_{10}$ is a hydrogen atom or an alkyl group which has 1 to 4 C atoms and which can be substituted, for example by a carbamoyl group, an alkanoyloxy group having 1 to 4 C atoms, a carboalkoxy group having 1 to 4 C atoms in the alkyl radical, or a hydroxyl, cyano or phenyl group; or in which $R_8$ and $R_9$, together with the nitrogen atom, form a 5-membered, 6-membered or 7-membered, heterocyclic radical which can also contain, as a further hetero-atom, a nitrogen, oxygen or sulfur atom, such as, for example, the piperidine, piperazine, morpholine, pyridine or pyrimidine ring, or $R_8$ and $R_9$ or $R_8$, $R_9$ and $R_{10}$, together with the positively charged nitrogen atom, form a 5-membered, 6-membered or 7-membered, heterocyclic radical which can also contain, as a further hetero-atom, a nitrogen, oxygen or sulfur atom, such as, for example, the piperidinium, morpholinium, piperazinium, 4-N-methylpiperazinium or pyridinium radical, it being possible for $R_{10}$ either to be part of the heterocyclic radical or to be a hydrogen atom or the said alkyl group; the benzene nucleus c can be substituted by 1 or 2, preferably one, substituents belonging to the group comprising halogen, such as chlorine and bromine, nitro, cyano, sulfamoyl, alkyl having 1 to 4 C atoms, alkoxy having 1 to 4 C atoms and carboalkoxy having 1 to 4 C atoms in the alkyl radical; the benzene nucleus d can be substituted by 1 or 2, preferably one, substituents belonging to the group comprising halogen, such as chlorine, nitro, alkyl having 1 to 4 C atoms, alkoxy having 1 to 4 C atoms and carboalkoxy having 1 to 4 C atoms in the alkyl radical; n is the number 1 or 2; and $X^{(-)}$ is the equivalent of a colorless anion corresponding to the meaning indicated earlier in the text.

The formulae $R_6$, $R_7$, $R_8$, $R_9$, $R_{10}$ and Alk, and also the substituents of c and d, can have meanings which are identical with one another or meanings which are different from one another. $R_{10}$ preferably has the same meaning as $R_7$.

The alky groups mentioned above are preferably methyl and ethyl groups, the alkoxy groups are preferably methoxy and ethoxy groups, the carboalkoxy groups are preferably carbomethoxy and carboethoxy groups and the alkanoyloxy groups are preferably the acetoxy group.

Finally, mention should also be made at this point of bis-quaternary dyes in which the molecule also contains an azo grouping in addition to an azamethine or diazamethine group, and which have also been found capable of use for carrying out the process claimed.

Further dyes which should be considered for the process claimed and which should be singled out particularly are those belonging to the class comprising the naphthalactam compounds corresponding to the general formulae (10) and (11)

on a triphenylmethane compound; the other substituents B, $Q_1^{(+)}$, $Q_2$ and $X^{(-)}$ have the meanings mentioned earlier in the text and m represents 0, 1, 2 or 3.

The subject of the present invention is a process for dyeing, in the gel state, fiber materials, such as slivers or filaments, which are composed of acid-modified acrylonitrile polymers and which have been produced by a conventional wet spinning process. In this case, the unstretched, partly stretched or stretched fibers or filaments—the state of hydration (water content) of which is between 5 and 150% of the weight of the polymer, preferably between 30 and 120%—have been almost completely freed, by washing in water, from the solvent used for the production of the spinning solution. The quantity of solvent entrained from the spinning process should not exceed a maximum of 5% after the pre-treatment has been carried out, which means that the residual content of solvent in the polymer intended for dyeing is between 0 and 5% (by weight). The fiber material which has been pre-treated in this way is then, without being dried, treated, at temperatures between 10° and 100° C., preferably between 20° and 90° C., and at a pH value between 2 and 7, preferably between 4 and 5.5, that is to say in a slightly acid range, with an aqueous solution of the dye. The dyeing time is between 1 second and 10 minutes; in general, dyeing is carried out for between 1 and 60 seconds, preferably between 3 and 20 seconds. The dyeing time stated corresponds to the

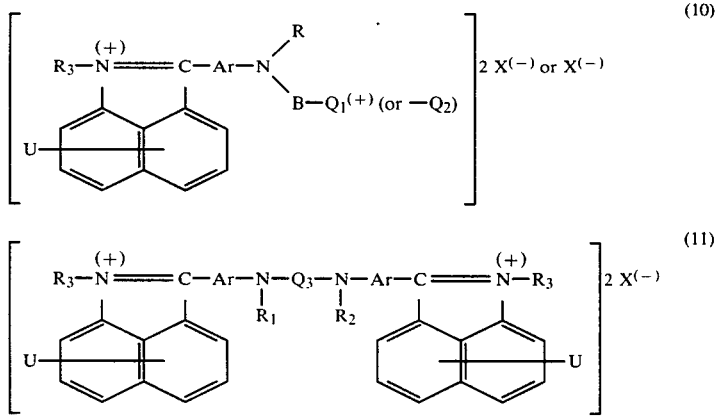

in which Ar, B, $Q_1^{(+)}$, $Q_2$, $Q_3$, R, $R_1$, $R_2$, $R_3$, U and $X^{(-)}$ are in agreement with the meanings mentioned earlier in the text for these substituents.

Finally, amongst the dyes which can be used in accordance with the invention, mention should be made of those which are derived from compounds of the general formulae (12) and (13)

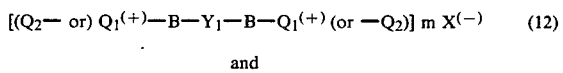

and

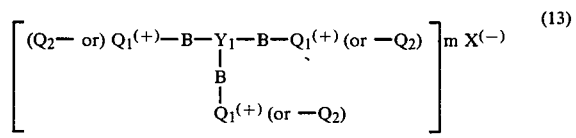

in which $Y_1$ represents the radical of a dye chromophore, such as, for example, a copper phthalocyanine which is optionally substituted by chlorine or phenyl, an anthraquinone derivative, a nitro dye or a dye based residence times of the fibers in the dye liquor through which the spun material passes after emerging from the spinneret and after the subsequent coagulation and washing processes. In this process, contact between the acrylonitrile polymer and the dye liquor can be effected in accordance with any procedure which is customary in practice, for example in an immersion trough, such as a padder. In order to enable the dye liquor to be utilized in an optimum manner, it is advantageous to pass the dye liquor counter-current or cross-current to the direction of forward motion of the fibers.

In accordance with the present invention, in the course of dyeing, one equivalent of each of the acid groups in the fiber substance combines with a corresponding quantity of groups in the dye which exhibit a basic behavior towards this group, with the formation of a bond similar to that of a salt.

In accordance with the process, the stretching of the fibers is effected before the dyeing process, during the dyeing process itself, or immediately afterwards. In addition, after dyeing has been carried out, it is possible, in addition, to after-treat the fibers by means of anionic or cationic softeners. It is also possible for this to be followed by a treatment with steam or hot air.

Apart from pH-regulating compounds, further chemicals are, in general, not required for carrying out the process claimed, but can be concomitantly used for special purposes.

Since electrolytes cause problems in many acrylonitrile gel dyeings which are customary in practice, it is advantageous if the dyes used in accordance with the invention are applied in an electrolyte-free state, that is to say it is particularly advantageous to employ them without major quantities of extenders or in the form of liquid formulations.

The concentration of the dye in the dyebath depends on both the dye used and also the shade and depth of the desired dyeing, and it can extend from a very low concentration up to a saturated solution of dye.

The dyeing operation itself, can, in accordance with the process, be effected continuously or discontinuously. During dyeing, while the fiber material is passing through continuously, the concentration of the dyebath is kept constant at the desired value, by adding, in a suitable manner, a solution of the dye having a concentration such that the dye absorbed by the slivers is continuously replaced. The slivers or filaments which have been dyed in this way are then fixed with steam or hot air under conditions customary in practice, are stretched, after-treated and, if appropriate, dried while permitting shrinkage, crimped and placed in cartons. The fastness properties achieved, such as fastness to light, water, perspiration and dry and wet rubbing and cross-dyeing, are faultless in all cases.

In addition to acrylonitrile polymers, substrates which are suitable for spinning for use in accordance with the process claimed are copolymers of acrylonitrile with other vinyl compounds, such as, for example, vinylidene cyanide, vinyl chloride, vinyl fluoride, vinyl acetate, vinyl propionate, vinylpyridine, vinylimidazole, vinylpyrrolidone, vinylethanol, acrylic acid, methacrylic acid, acrylic esters, methacrylic esters, acrylamides of methacrylamides, these copolymers containing at least 50% by weight, preferably at least 85% by weight of acrylonitrile units. The homopolymers of acrylonitrile used or copolymers thereof are acid-modified; they contain at least one acid group, such as, for example, sulfo or sulfato groups, which has been introduced in each case into the end of the polymer chains by means of a catalyst, or which has been copolymerized in the form of comonomers containing acid groups, such as, for example, acrylic acid, itaconic acid, vinylsulfonic acid, styrenesulfonic acid, allylsulfonic acid, methallylsulfonic acid, a vinyloxyarenesulfonic acid, an allyloxyarenesulfonic acid, a methallyloxyarenesulfonic acid or an acryloyloxyalkoxyarenesulfonic acid and alkali metal salts thereof.

Thus any acrylonitrile polymers which contain acid groups capable of binding the basic dyes used are suitable for use in accordance with the invention. Such acid groups are present in the material to be spun in amounts of between 10 and 150 milliequivalents per kg of polymer, preferably between 20 and 80 milliequivalents per kg of polymer.

The acrylonitrile polymers described can be spun from any solvents customary in practice, this being followed by dyeing with the dyes according to the invention. Examples of such inorganic spinning solvents which may be mentioned here are calcium chloride, zinc chloride or sodium thiocyanate solutions.

In addition, nitric acid is also suitable as a solvent for spinning the acrylonitrile polymer.

Further solvents, of an organic character, which are suitable for the spinning process are dimethylformamide, dimethylacetamide, ethylene carbonate, $\beta$-butyrolactone, tetramethylene sulfone, dimethyl sulfoxide and the like.

In the wet spinning procedure which is carried out in the present case, the dissolved polymer is spun into a coagulation bath containing about 30 to 70% by weight, preferably 40 to 60% by weight, of water, in addition to the solvent used for dissolving the polymer; after the coagulation bath, the filaments thus spun can pass through a stretching bath which additionally contains about 30 to 85% by weight, preferably 40 to 85% by weight of water; this is followed, for example, by a wash bath which is also composed of over 70% by weight, preferably over 80% by weight, of water, or is composed wholly of water. As already mentioned earlier in the text, the measures taken for the stretching operation in the process claimed can also be carried out during the dyeing operation or subsequently thereto.

The age of the spun material is not very important for the process of the present invention. Both freshly spun tow and also spun material which was 3 months old and had been stored in closed cans exhibited the same deep coloration and complete penetration of the fibers after the dyeing process.

The examples which follow serve to illustrate the invention. Unless a note is made to the contrary, the parts and percentages indicated in these examples are parts by weight and percentages by weight. Parts by volume bear the same relationship to parts by weight as liters to kilograms.

EXAMPLE 1

An acrylonitrile copolymer, composed of 94% of acrylonitrile, 5% of methyl acrylate and 1% of Na methallylsulfonate, is wet-spun, in the form of a 28% strength spinning solution in dimethylformamide, according to standard conditions at 80° C. using a 100-hole spinneret with a hole diameter of 80 μm, a coagulation bath at 50° C. being used, which consists of 50% of dimethylformamide and 50% of water. The spun material is thereafter freed from dimethylformamide by washing with water at 90° to 95° C.

A quantity of 10 g (dry weight), corresponding to 20 g moist weight, of the filament material obtained is then introduced, without previous drying, for 60 seconds into a solution which has been adjusted to pH 4.5 by means of acetic acid and which contains 0.01 g of a bis-quaternary dye of the formula

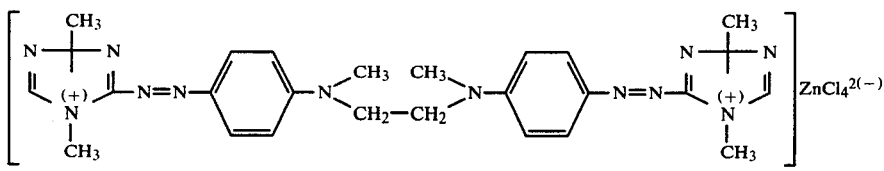

in 250 ml of water at room temperature, the liquor being well agitated. A virtually complete exhaustion of the bath is observed after the indicated residence time of the spun material in the dye liquor has expired. The filaments thus treated are then stretched, in the ratio 1:1.5, in a stretching bath at 80° C. which is composed of 70% of water and 30% of dimethylformamide. The dyed goods are dried in the usual manner after they have been rinsed for a short time in cold water.

A bluish tinged red dyeing with excellent fastness properties, principally particularly good fastness to wet processing and very good lightfastness, is obtained.

EXAMPLE 2

If, in the dyeing process carried out in Example 1, a solution of 0.05 g of the dye mentioned in Example 1 in 100 ml of water is used, and a dyeing time of 10 seconds is maintained, an intense dyeing of the filament material with excellent fastness properties is likewise obtained.

If the dyeing time is now reduced still further to 3 seconds, although a somewhat lighter dyeing is obtained, it also exhibits excellent fastness properties and complete penetration of the filament material by the dye over the total fiber cross-section.

EXAMPLE 3

If the filament material of Example 1 is continuously passed (as continuous filaments) through the dyebath used according to Example 2, a residence time of the filaments in the dye liquor of 3 seconds and a downstream air passage of the running filament of 2 minutes at room temperature being established, and the goods thus dyed are rinsed and after-treated and then dried, a dyeing result which is as good as that in Example 2 is obtained. In this process, the dye employed does not noticeably bleed into the rinsing and after-treatment baths.

If a residence time of 2 seconds and otherwise identical conditions are maintained, a somewhat lighter dyeing is obtained, and for a residence time of 10 seconds a darker dyeing is obtained.

EXAMPLE 4

If, in the dyeing process described in Example 1, the rinsing operation of the dyed filament material is followed by a treatment of this material during the course of 30 seconds in a solution of 0.5 g of a softener of the formula

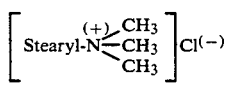

in 100 ml of water at room temperature, this after-treatment does not lead to any bleeding out of the dye in the after-treatment bath used.

EXAMPLE 5

If the polymer of Example 1 is used, but is spun, in this case, using dimethylacetamide as the solvent in a wet spinning process customary in practice, the dyeing process described in Example 1 can be carried out with the spun material obtained in this manner, with the same good result. The dye fixation proceeds just as rapidly and completely.

EXAMPLE 6

If the polymer of Example 1 is used, but is spun, in this case, using ethylene carbonate as the solvent in a wet spinning process customary in practice, the dyeing process described in Example 1 can be carried out with the spun material obtained in this manner, with the same good result. The dye fixation proceeds rapidly and completely.

EXAMPLE 7

If the polymer of Example 1 is used, but is spun, in this case, using dimethylsulfoxide as the solvent in a wet spinning process customary in practice, the dyeing process described in Example 1 can be carried out with the spun material obtained in this manner, with the same good result. The dye fixation proceeds rapidly and completely.

EXAMPLE 8

If the polymer of Example 1 is used, but is spun, in this case, using a 48% strength aqueous Na thiocyanate solution as the solvent in a wet spinning process customary in practice, the dyeing process described in Example 1 can be carried out with the spun material obtained in this manner, with the same good result. The dye fixation proceeds rapidly and completely.

EXAMPLE 9

If the polymer of Example 1 is used, but is spun, in this case, using concentrated nitric acid as the solvent in a wet spinning process customary in practice, the dyeing process described in Example 1 can be carried out with the spun material obtained in this manner, with the same result.

EXAMPLES 10 TO 16

If the polymer used in Example 1 is now replaced by other polymers with the following composition, a very rapid and firm dye fixation is also obtained, according to the dyeing instructions of Example 1, with the spun material obtained in this manner:

| Example | Polymer composed of |
| --- | --- |
| 10 | 94% of acrylonitrile |
|  | 4% of methyl acrylate |
|  | 2% of Na methallylsulfonate |
| 11 | 95% of acrylonitrile |
|  | 4.5% of methyl acrylate |
|  | 0.5% of acrylic acid |

-continued

| Example | Polymer composed of |
|---|---|
| 12 | 85% of acrylonitrile |
|  | 13% of vinyl chloride |
|  | 2% of Na allylsulfonate |
| 13 | 85% of acrylonitrile |
|  | 14.5% of vinyl acetate |
|  | 0.5% of Na vinylsulfonate |
| 14 | 59% of acrylonitrile |
|  | 40% of vinylidene chloride |
|  | 1% of Na methallylsulfonate |
| 15 | 94% of acrylonitrile |
|  | 5% of methyl acrylate |
|  | 1% of Na styrene-4-sulfonate |
| 16 | 94% of acrylonitrile |
|  | 4% of vinyl acetate |
|  | 1% of Na methallylsulfonate |
|  | 1% of Na itaconate |

EXAMPLE 17

If, instead of the filaments produced according to Example 1, filaments are used, in this case, to which 0.2 part of a commercial titanium dioxide delustering agent (relative to the polymer) have been added in the spinning process, a good dye fixation and very good fastness properties are also obtained on dyeing the spun material according to the procedure of Example 1.

EXAMPLES 18 AND 19

If the dyeing of the spun material is carried out at a dyeing temperature of 60° C. or 90° C., instead of in accordance with the data of Example 1, but under otherwise identical conditions, a somewhat deeper coloration of the filaments is obtained, with equally good fastness properties.

EXAMPLE 20

If, instead of the filament material employed in Example 1, a filament material of identical polymer composition is used, which has the same dry weight (=10 g), but a moist weight of 25 g (that is to say, a highly hydrated material), a very good dye fixation on the spun material is also obtained if the dyeing process is carried out according to the data of Example 1.

EXAMPLE 21

If, in the case of the filament material produced according to Example 1, the moist weight of the spun material is reduced to 15 g by partial drying of this material at room temperature, a strong dye fixation is also obtained on dyeing under the conditions described in Example 1.

EXAMPLE 22

If, in this case, a conventional mono-quaternary dye of the formula

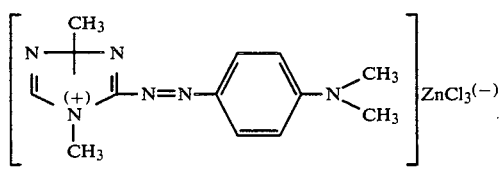

is used for dyeing, instead of the dye used in Example 1, only a very incomplete dye fixation, that is to say a large part of the dye remains in the dye liquor, is obtained on the spun material, according to the procedure of Example 1. In this case, no increase of the dye fixation can be achieved by an extension of the residence time.

In contrast to this, the dyeing of the same filament material with the bis-quaternary dye of Example 1 already yields a very extensive exhaustion of the dye liquor after expiry of the normal dyeing time.

EXAMPLES 23 AND 24

If the spun material is dyed, in this case, with quantities of 0.03 g or 0.001 g of the bis-quaternary dye of Example 1, instead of the quantity of 0.01 g of dye used in Example 1, an equally rapid and firm dye fixation is obtained according to the procedure of Example 1, with the depth of shade correspondingly increased or reduced in the color test available. The fastness properties of the dyeings are likewise very good.

EXAMPLES 25 AND 26

If, in the course of the procedure of Example 1, the freshly spun filament material is washed, after the coagulation process, in such a manner that a residual content of the dimethylformamide used as the spinning solvent of 2% or 5% still remains in the spun material employed in the dyeing process, a very strong dye fixation is likewise obtained in the dyeing operation according to the instructions of Example 1.

EXAMPLES 27 AND 28

If the dyeing process of Example 1 is carried out, in this case, at pH values of 3 or 6, instead of at pH 4.5, but otherwise under the same operational conditions, the same dyeing result as in Example 1 is obtained.

EXAMPLE 29

If the wet spinning of the polymer is carried out according to the data of Example 1, but the filament material obtained is stretched in a manner which is customary in practice, before the actual dyeing process, in the ratio of 1:1.5, that is to say by 50%, a very good dye fixation is likewise obtained on dyeing according to the instructions of Example 1.

EXAMPLE 30

If the dyeing process is carried out according to the data of Example 2, but the passage of the filament material is counter-current to the flow of the dye liquor, a dyebath in the form of a tube being used, a complete exhaustion of the dyebath is achieved, that is to say, because of the very good dye fixation, a residual dyebath which has been freed of all residues of dye emerges after expiry of the residence time.

EXAMPLE 31

If the dyeing process described in Example 3 is carried out with simultaneous stretching of the filament material in the ratio of 1:3, a dyeing result which is as good as that in Example 3 is obtained.

EXAMPLE 32

If, in the procedure of Example 1 for dyeing the spun material, in this case a mixture of dyes in the quantities indicated below is used: 0.005 g of the dye of the formula

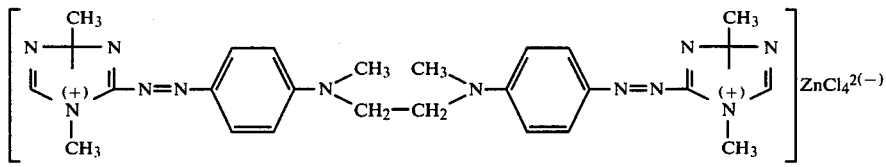

0.003 g of the dye of the formula

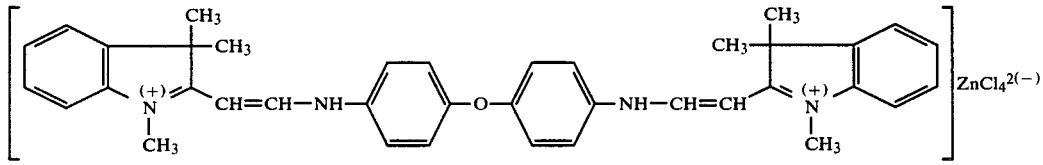

0.002 g of the dye of the formula

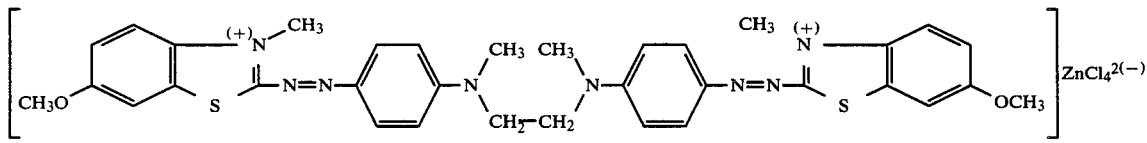

an intense brown dyeing with very good fastness properties, particularly with very good lightfastness, fastness to washing and fastness to alkaline perspiration, is obtained.

EXAMPLE 33

If, in the procedure of Example 1, the actual dyeing of the filament material is followed by a steaming process of the same material during the course of 30 minutes at approximately 102° C. or 10 minutes at 115° C., a very good dyeing result is likewise obtained.

TABLE OF EXAMPLES

A very good dye fixation, that is to say a good exhaustion of the bath and a very high level of fastness is obtained, otherwise identical conditions being maintained, if, instead of the dye used in Example 1, in this case other dyes of the following formulae are employed for dyeing the spun material:

| Example | Formula | Shade |
|---|---|---|
| 34 | | reddish-tinged blue |
| 35 | | bluish-tinged violet |
| 36 | | bluish-tinged violet |
| 37 | | violet |
| 38 | | reddish-tinged violet |

| Example | Formula | Shade |
|---|---|---|
| 39 | | violet |
| 40 | | bluish-tinged red |
| 41 | | yellowish-tinged red |
| 42 | | red |
| 43 | | orange |

-continued
| Example | Formula | Shade |
|---|---|---|
| 44 | 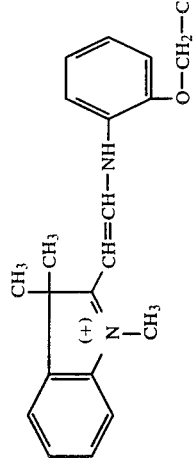 | yellow |
| 45 | 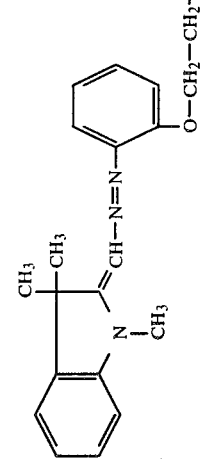 | reddish-tinged yellow |
| 46 | 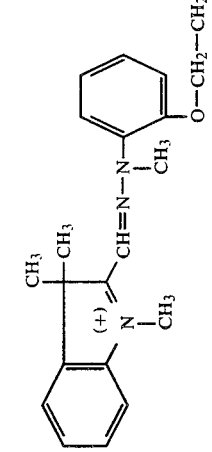 | reddish-tinged yellow |
| 47 | 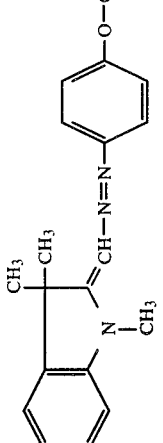 | reddish-tinged yellow |
| 48 | 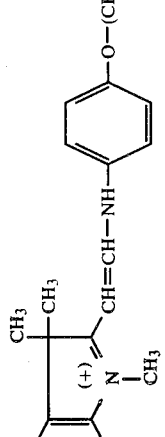 | yellow |

| Example | Formula | Shade |
|---|---|---|
| 49 | | yellow |
| 50 | | reddish-tinged yellow |
| 51 | | yellow |
| 52 | | yellow |
| 53 | | orange |

-continued

| Example | Formula | Shade |
|---|---|---|
| 54 | (structure with ZnCl$_4^{2(-)}$) | reddish-tinged blue |
| 55 | (structure with 2 BF$_4^{(-)}$) | yellow |
| 56 | (structure with ZnCl$_4^{2(-)}$) | claret |
| 57 | (structure with BF$_4^{(-)}$) | red |

| Example | Formula | Shade |
|---|---|---|
| 58 | [structure with CH₃-N-phenyl-N=C(S⁺)-phenyl group, -C(=O)-O-C₂H₅, linked to -N(CH₃)-phenyl-N-CH₂-CH₂-N(C₂H₅)₂] CH₃SO₄⁽⁻⁾ | blue |
| 59 | [bis-pyridinium structure: two N-methylpyridinium groups with -C(=O)-O-CH₂-CH₂- linkers to central N-phenyl-N=N-phenyl(Cl)(NO₂)] 2 Cl⁽⁻⁾ | red |
| 60 | [structure with CH₃-N-phenyl(OCH₃)-C(S⁺)=N-N=phenyl-N(CH₃)-CH₂-CH₂-N(CH₃)₂] CH₃SO₄⁽⁻⁾ | blue |
| 61 | [structure with CH₃-N-phenyl-N=C(S⁺)-CH₂-phenyl linked to phenyl(CH₃)-N(C₂H₅)-CH₂-CH₂-N⁽⁺⁾(CH₃)₂-CH₂-phenyl] 2 Cl⁽⁻⁾ | violet |

-continued

| Example | Formula | Shade |
|---|---|---|
| 62 | (naphthalene-quinolinium with N-CH3)-N=N-C6H4-N(CH3)-CH2-CH2-N(CH3)2 · CH3COO(−) | blue |
| 63 | (1,3-dimethyl-imidazolinium)-N=N-C6H4(o-O-CH2-CH2-N(CH3)2) · BF4(−) | red |
| 64 | [(N-methyl-pyridinium)-CH2-CH2-N(C2H5)-C6H4-N=N-C6H3(CH3)(OC2H5)-S(+)-N(CH3)=] · ZnCl4(2−) | blue |
| 65 | [CH3-N(H)-C6H4-N=N-C6H3(CH3)-N(C2H5)-(CH2)2-O-CO-(CH2)4-CO-O-(CH2)2-N(C2H5)-C6H3(CH3)-N=N-C6H4-S(+)-N(CH3)(C6H4-CH3)] · 2 Cl(−) (bis-cationic) | blue |
| 66 | [(C2H5)2N-C6H4-N=N-C6H4-N(C2H5)-CH2-CH2-N(+)(CH3)3 ; CH3-N=S(+)-C6H3(CH3)-N=N-C6H4-] · 2 Cl(−) | blue |

-continued

| Example | Formula | Shade |
|---|---|---|
| 67 | (structure with trimethylammonium groups, 3 Cl⁻) | blue |
| 68 | (structure with Cl⁻) | orange |
| 69 | (structure with 2 CH₃COO⁻) | bluish-tinged red |
| 70 | (structure with 2 BF₄⁻) | violet |
| 71 | (structure with 2 BF₄⁻) | blue |

-continued

| Example | Formula | Shade |
|---|---|---|
| 72 | (structure with two triazolium groups, 2 BF$_4^{2(-)}$) | claret |
| 73 | (structure with benzoyl-substituted triazolium groups, ZnCl$_4^{2(-)}$) | red |
| 74 | (structure with thiazolium and N(CH$_3$)$_3^{(+)}$, 2 Cl$^{(-)}$) | green |
| 75 | (bis-azo structure with ether linkage, SO$_4^{2(-)}$) | red |
| 76 | (structure with piperazine linker and thiazolium groups, 2 Cl$^{(-)}$) | violet |

-continued

| Example | Formula | Shade |
|---|---|---|
| 77 | | yellow |
| 78 | | yellow |
| 79 | | reddish-tinged violet |
| 80 | | yellowish-tinged red |
| 81 | | red |

-continued
| Example | Formula | Shade |
|---|---|---|
| 82 | 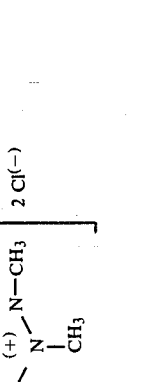 | red |
| 83 |  | red |
| 84 | 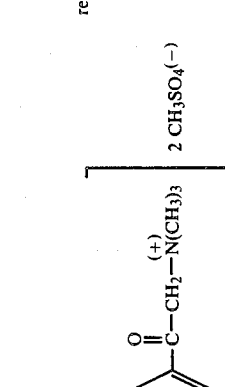 | reddish-tinged yellow |
| 85 | 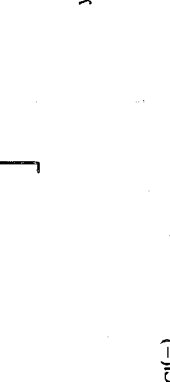 | yellowish-tinged red |
| 86 | 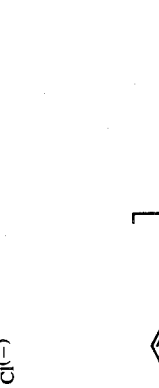 | green |

-continued

| Example | Formula | Shade |
|---|---|---|
| 87 | (structure with two indolenium groups connected via bis(N-methylanilino)propyl linker, 2 Cl⁻) | yellow |
| 88 | (4-nitrophenyl indolenium with p-(N-methyl-N-(2-aminoethoxyethyl)anilino) styryl, ZnCl₄²⁻) | blue |
| 89 | (5-methyl indolenium with p-(N-ethyl-N-(2-dimethylaminoethyl)anilino) styryl, ZnCl₄²⁻)₂ | red |
| 90 | (naphth[2,1]indolenium with p-(N-butyl-N-(2-dimethylaminoethoxyethyl)anilino) styryl, Cl⁻) | orange |
| 91 | (bis-indolenium structure linked via NH-CH=CH-phenyl-NH-CH=CH, 2 Cl⁻) | reddish-tinged yellow |

| Example | Formula | Shade |
|---|---|---|
| 92 | (structure with 2 Cl(−)) | red |
| 93 | (structure with 2 CH₃COO(−)) | red |
| 94 | (structure with 2 SCN(−)) | reddish-tinged yellow |
| 95 | (structure with 2 Cl(−)) | yellow |

-continued

| Example | Formula | Shade |
|---|---|---|
| 105 | | reddish-tinged blue |
| 106 | | blue |
| 107 | | violet |
| 108 | | yellow |

-continued
| Example | Formula | Shade |
|---|---|---|
| 109 | 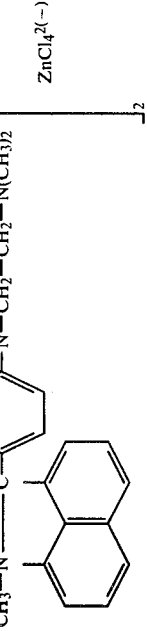 $\left[\text{structure}\right]_2$ ZnCl$_4^{2(-)}$ | blue |
| 110 | 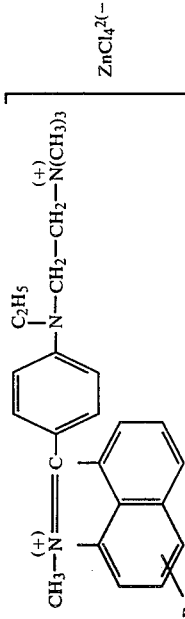 ZnCl$_4^{2(-)}$ | blue |
| 111 | 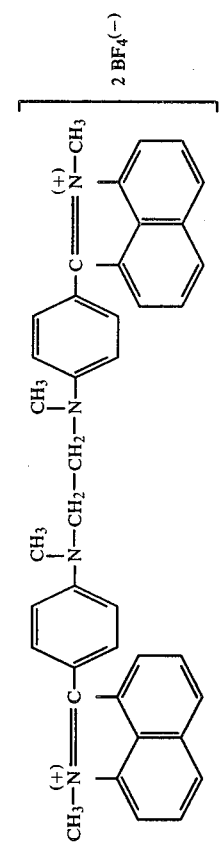 2 BF$_4^{(-)}$ | blue |
| 112 | 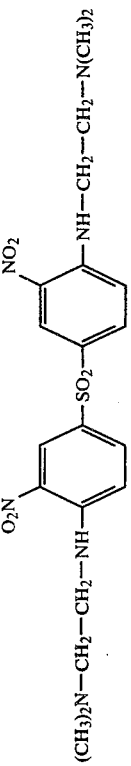 | yellow |

We claim:
1. In a process for dyeing a fiber material containing an acid-modified polymer or copolymer of acrylonitrile formed by a conventional wet spinning method,
wherein after fiber-forming and removal of the majority of the non-aqueous spinning solvent, either before or during or after the concluding fiber stretching operation, the undyed spun product in a swollen gel-like state and in a substantially aqueous dyeing medium is treated with an aqueous solution of at least one dyestuff with which dyeing is effected by an acid-base reaction between the dyestuff and the fiber,
the improvement which comprises treating the undyed spun product with a dyestuff which acts as a base towards the acid groups of the fiber substance and which contains in its chromophoric molecular portion more than one basic group capable of entering into salt formation with the fiber under the applied dyeing conditions.

2. A process as claimed in claim 1, wherein each basic group of said dyestuff is a quaternary moiety selected from the group consisting of ammonium, dialkyl hydrazonium and cyclammonium groups.

3. A process as claimed in claim 1, where at least one basic group in said dyestuff acts as a base and contains at least one quaternary moiety selected from the group consisting of ammonium, dialkyl hydrazonium and cyclammonium and wherein said dyestuff contains one or more uncharged groups which are capable of being protonized under the applied dyeing conditions and are selected from the group consisting of aliphatically linked, primary, secondary and tertiary amino, guanidino, amidino and hydrazino.

4. A process as claimed in claim 1, wherein each basic group in said dyestuff is an uncharged moiety capable of being protonized under the applied dyeing conditions and is selected from the group consisting of aliphatically linked, primary, secondary and tertiary amino, guanidino, amidino and hydrazino.

5. A process as claimed in claim 1, wherein the dyestuff is a monoazo dye of the formula

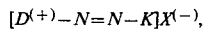

or

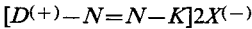

when K contains a quaternary grouping, in which
D$^{(+)}$ is the radical of an aromatic, carbocylic or heterocyclic diazo component which contains as the cationic quaternary grouping a cyclammonium group as a constituent of a mesomeric 5-membered or 6-membered cationic nitrogenous ring system free of or containing additional hetero-atoms or said system to which is directly linked or fused an aromatic carbocylic moiety of the benzene or naphthalene series, said ring system being unsubstituted or substituted in the heterocylic or carbocyclic moiety or both, or contains as the cationic quaternary grouping an ammonium or hydrazonium group which is linked directly or via a bridge member to an unsubstituted or substituted, aromatic, carbocyclic or which radical heterocylic moiety of the diazo component of the benzene, naphthalene or benzthiazole series;
K is the radical of an aromatic, carbocylic or heterocyclic coupling component of the benzene, naphthalene or indole series, containing attached to the aromatic moiety directly or via a bridge member at least one uncharged moiety selected from the group consisting of aliphatically linked, primary, secondary and tertiary amino groups or is a cationic quaternary ammonium group, said basic or quaternary group(s) being linked non-annularly or as constituent of a mesomeric 5-membered or 6-membered uncharged or cationic nitrogenous ring system free of or containing additional heteroatoms, or an amidino, guanidino, hydrazino or thiuronium group, said ring system being unsubstituted or substituted in the heterocylic or carbocyclic moiety, or both;
and X$^{(-)}$ is the equivalent of a colorless anion.

6. A process as claimed in claim 1, wherein the dyestuff used is a monoazo dye of the formula (2a):

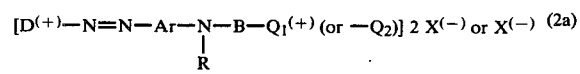

or of the formula (2b):

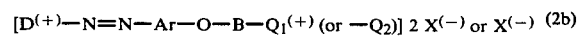

or of the formula (2c):

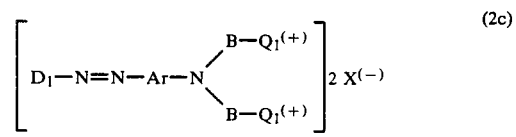

in which D$^{(+)}$ is the radical of an aromatic, carbocyclic or heterocyclic diazo component which contains as the cationic quaternary grouping a cyclammonium group as a constituent of a mesomeric 5-membered or 6-membered cationic nitrogenous ring system free of or containing additional hetero-atoms, or said system to which is directly linked or fused an aromatic carbocyclic moiety of the benzene or naphthalene series, said ring system being unsubstituted or substituted in the heterocyclic or carbocyclic moiety or both, or which radical contains as the cationic quaternary grouping an ammonium or hydrazonium group which is linked directly or via a bridge member to an unsubstituted or substituted, aromatic, carbocyclic or heterocyclic moiety of the diazo component of the benzene, naphthalene or benzthiazole series;
D$_1$ is the radical of an aromatic, carbocyclic or heterocylic diazo component of the benzene or naphthalene series, which radical is free of or contains one or more basic or non-ionic substituents;
Ar is p-phenylene or 1,4-naphthylene which is free of or contains 1 or 2 non-ionic substituents;
R is hydrogen or lower alkyl unsubstituted or substituted, or aralkyl or cycloalkyl;
B is a bivalent aliphatic bridge member which is alkylene of from 1 to 6 carbon atoms or lower alkenylene;
Q$_1^{(+)}$ is a cationic quaternary ammonium group, a hydrazonium group or a cyclammonium group as a constituent of a mesomeric 5-membered or 6-membered cationic nitrogenous ring system;
Q$_2$ is an uncharged basic moiety which is a primary, secondary or tertiary amino group linked nonannularly or as a constituent of a mesomeric 5-membered or 6-membered uncharged nitrogenous ring system, or is an amidino, guanidino or hydrazino group;

and $X^{(-)}$ is the equivalent of a colorless anion;

the moieties which each occur twice in formula (2c) being identical or different from one another.

7. A process as claimed in claim 1, wherein the dyestuff is a disazo dye of the formula (3a):

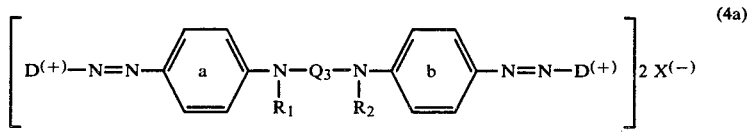

or of the formula (3b):

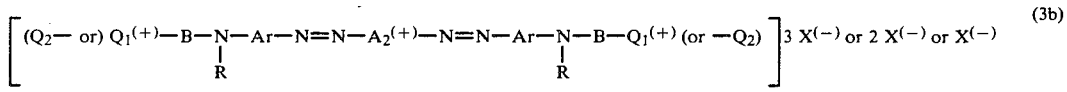

ponent $A_2^{(+)}$ must contain more than one cationic quaternary ammonium grouping; and $X^{(-)}$ is the equivalent of a colorless anion;

the moieties which occur twice in the formulae (3a) and (3b) being identical or different from one another.

8. A process as claimed in claim 1, wherein the dyestuff is a disazo dye of the formula (4a);

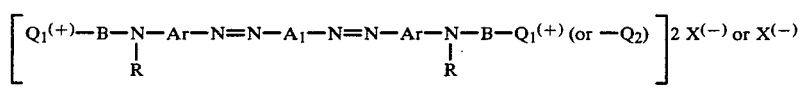

or of the formula (4b):

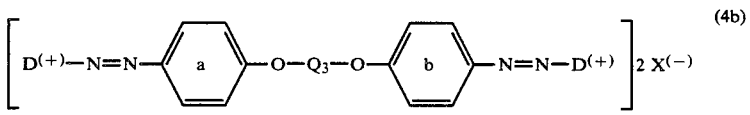

in which $A_1$ is the radical of an aromatic, carbocyclic or heterocyclic tetrazo component;

$A_2^{(+)}$ is the radical of an aromatic, carbocyclic or heterocyclic tetrazo component containing at least one cationic quarternary ammonium grouping linked non-annularly or as a constituent of a mesomeric 5-membered or 6-membered cationic nitrogenous ring system;

Ar is p-phenylene or 1,4-naphthylene which is free of or contains 1 or 2 non-ionic substituents;

R is hydrogen or lower alkyl unsubstituted or substituted, or aralkyl or cycloalkyl;

B is a bivalent aliphatic bridge member which is alkylene of from 1 to 6 carbon atoms or lower alkenylene;

$Q_1^{(+)}$ is a cationic quaternary ammonium group, a hydrazonium group or a cyclammonium group as a constituent of a mesomeric 5-membered or 6-membered cationic nitrogenous ring system;

$Q_2$ is an uncharged basic moiety which is a primary, secondary or tertiary amino group linked non-annularly or as a constituent of a mesomeric 5-membered or 6-membered uncharged nitrogenous ring system, or is an amidino, guanidino or hydrazino group;

the radicals $Q_1^{(+)}$ and $Q_2$ individually or together being linked directly or via the bridge member B to the respective arylene radicals Ar to which they are attached, provided that $Q_2$ in formula (3a) is linked directly to Ar, and as regards formula (3b) when there are two radicals $Q_2$ linked directly on either side to an Ar the radical of the tetrazo com- $D^{(+)}$ is the radical of an aromatic, carbocylic or heterocylic diazo component which contains as the cationic quaternary grouping a cyclammonium group as a constituent of a mesomeric 5-membered or 6-membered cationic nitrogenous ring system free of or containing additional hetero-atoms or said system to which is directly linked or fused an aromatic carbocylic moiety of the benzene or naphthalene series, said ring system being unsubstituted or substituted in the heterocyclic or carbocyclic moiety, or both, or which radical contains as the cationic quaternary grouping an ammonium or hydrazonium group which is linked directly or via a bridge member to an unsubstituted or substituted aromatic, carbocyclic or heterocyclic moiety of the diazo component of the benzene, naphthalene or benzthiazole series;

$Q_3$ is lower alkylene which is uninterrupted or interrupted by —O— or —NH— or an aromatic carbocylic radical;

$R_1$ and $R_2$ are identical or different from one another, and each is hydrogen or a lower alkyl group unsubstituted or substituted; or $R_1$ and $R_2$, together with the two nitrogen atoms to which they are attached and the radical $Q_3$ form a nitrogenous ring system;

each of the benzene nuclei a and b, independently of the other, being free of or containing 1 or 2 identical or different non-ionic substituents, or the benzene nuclei a or b, or both, being fused with a benzene nucleus, thus forming a naphthylene moiety;

9. A process as claimed in claim 1, wherein the dyestuff is a methine dye of the formulae (5)

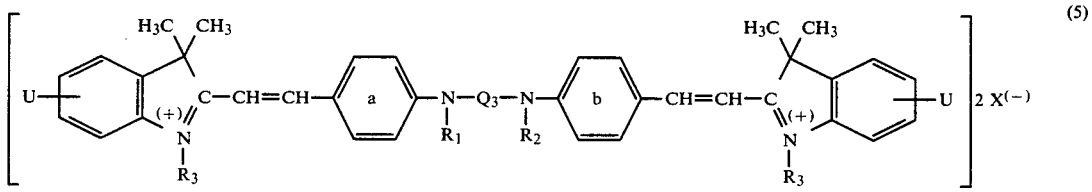

in which
- $Q_3$ is lower alkylene which is uninterrupted or interrupted by —O— or —NH— or an aromatic carbocyclic radical;
- $R_1$ and $R_2$ are identical or different from one another, and each is hydrogen or lower alkyl unsubstituted or substituted, or $R_1$ and $R_2$ together with the two nitrogen atoms to which they are attached and the radical $Q_3$ form a nitrogenous ring system;
- each of the benzene nuclei a and b, independently of the other, being free of or containing 1 or 2 identical or different non-ionic substituents, or the benzene nucleus a or b, or both, being fused with a benzene nucleus, thus forming a naphthylene moiety;

10. A process as claimed in claim 1, wherein the dyestuff is an azamethine dye of the formula (6)

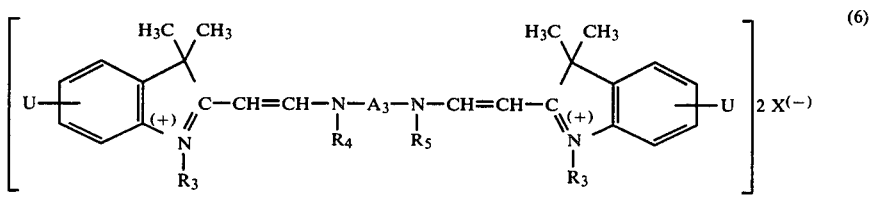

or a diazamethine dye of the formula (7)

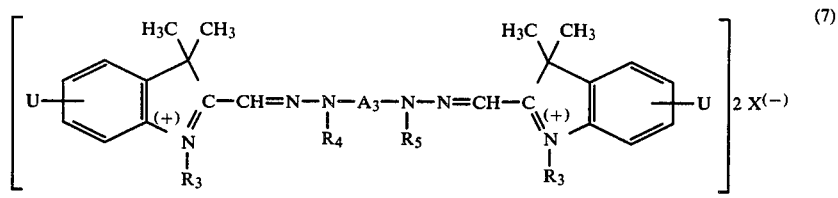

in which
- $R_3$ is lower alkyl unsubstituted or substituted, or aralkyl;
- U is hydrogen or a non-ionic substituent;
- $A_3$ represents the bivalent radical of one or more aromatic, carbocyclic or heterocyclic nuclei, which when occurring several times are identical to or different from one another and are linked to one another directly or through a non-aromatic bridge member;
- $R_4$ and $R_5$ are identical or different from one another and each is hydrogen or lower alkyl unsubstituted or substituted; and
- $X^{(-)}$ is the equivalent of a colorless anion;
- the moieties which each occur twice in the formulae (6) and (7) being identical to or different from one another.

11. A process as claimed in claim 1, wherein the dyestuff is a methine dye of the formula (8)

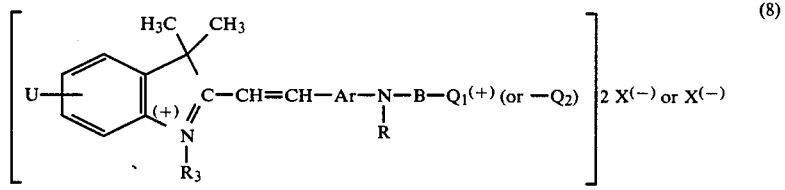

$R_3$ is lower alkyl unsubstituted or substituted, or aralkyl;
U is hydrogen or a non-ionic substituent;
and $X^{(-)}$ is the equivalent of a colorless anion;
the moieties which each occur twice in formula (5) being identical or different from one another.

in which
Ar is p-phenylene or 1,4-naphthylene which is free of or contains 1 or 2 non-ionic substituents;
B is a bivalent aliphatic bridge member which is alkylene of from 1 to 6 carbon atoms or lower alkenylene;

R is hydrogen or lower alkyl unsubstituted or substituted, or aralkyl or cycloalkyl;

R₃ is lower alkyl unsubstituted or substituted, or aralkyl;

Q₁⁽⁺⁾ is a cationic quaternary ammonium group, a hydrazonium group or a cyclammonium group as a constituent of a mesomeric 5-membered or 6-membered cationic nitrogenous ring system;

Q₂ is an uncharged, basic moiety which is a primary, secondary or tertiary amino group linked non-annularly or as a constituent of a mesomeric 5-membered or 6-membered uncharged nitrogenous ring system, or is an amidino, guanidino or hydrazino group;

U is hydrogen or a non-ionic substituent; and

X⁽⁻⁾ is the equivalent of a colorless anion.

12. A process as claimed in claim 1, 2 or 3, wherein the dyestuff is an azamethine or diazamethine dye of the formula (9)

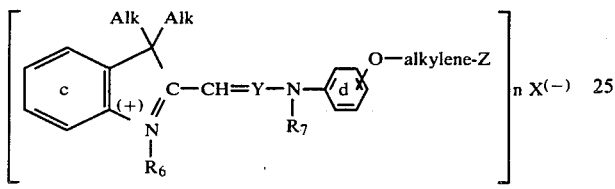

in which R₆ is alkyl of from 1 to 4 carbon atoms which is free of or contains non-ionic substituents;

"Alk" is alkyl of from 1 to 4 carbon atoms, both being identical to or different from one another;

Y is a methine bridge member (CH) or a nitrogen atom;

R₇ is hydrogen or alkyl of from 1 to 4 carbon atoms which is free of or contains non-ionic substituents;

"alkylene" is a straight-chain or branched alkylene group of from 2 to 6 carbon atoms;

Z is a group of the formula (9a) or (9b):

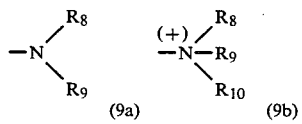

in which

R₈ is alkyl of from 1 to 4 carbon atoms which is free of or contains non-ionic substituents;

R₉ is alkyl of from 1 to 4 carbon atoms which is free of or contains non-ionic substituents, or is phenyl which is free of or contains 1 or 2 non-ionic substituents; and R₁₀ is hydrogen or alkyl of from 1 to 4 carbon atoms which is free of or contains non-ionic substituents, or in which R₈ and R₉, together with the nitrogen atom to which they are attached, form a 5-membered, 6-membered or 7-membered uncharged nitrogenous ring system free of or containing additional hetero-atoms;

or R₈ and R₉ or R₈, R₉ and R₁₀, together with positively charged nitrogen atom to which they are attached, form a 5-membered, 6-membered or 7-membered, cationic nitrogenous ring system free of or containing additional hetero-atoms;

R₁₀ being either part of the ring system or hydrogen or the aforementioned alkyl group;

each of the benzene nuclei c and d, independently of the other, being free of or containing 1 or 2 identical or different non-ionic substituents;

n represents the number 1 or 2; and

X⁽⁻⁾ is the equivalent of a colorless anion.

13. A process as claimed in claim 1, wherein the dyestuff is a naphthalactam dye of the formula (10) or (11):

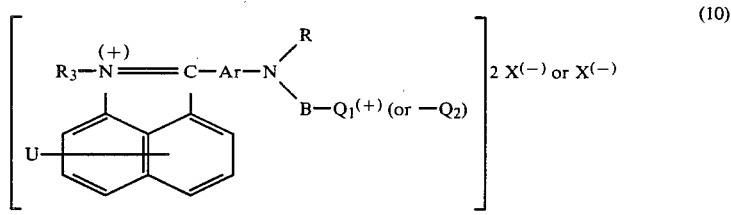

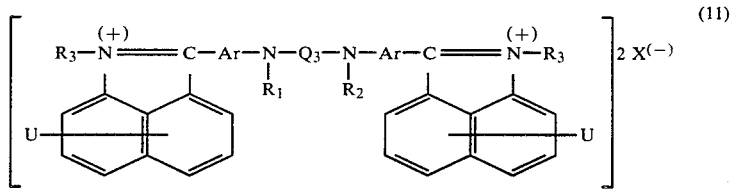

in which

Ar is p-phenylene or 1,4-naphthylene which is free of or contains 1 or 2 non-ionic substituents;

B is a bivalent aliphatic bridge member which is alkylene of from 1 to 6 carbon atoms or lower alkenylene;

Q₁⁽⁺⁾ is a cationic quaternary ammonium group, a hydrazonium group or a cyclammonium group as constituent of a mesomeric 5-membered or 6-membered cationic nitrogenous ring system;

Q₂ is an uncharged basic moiety which is a primary, secondary or tertiary amino group linked non-annularly or as a constituent of a mesomeric 5-membered or 6-membered uncharged nitrogenous ring system, or is an amidino, guanidino or hydrazino group;

Q₃ represents a lower alkylene radical which is uninterrupted or interrupted by —O— or —NH— or an aromatic carbocyclic radical;

R is hydrogen or lower alkyl unsubstituted or substituted, or aralkyl or cycloalkyl;

$R_1$ and $R_2$ are identical or different from one another, and each is hydrogen or lower alkyl unsubstituted or substituted, or $R_1$ and $R_2$ together with the two nitrogen atoms to which they are attached and the radical $Q_3$ form a nitrogenous ring system;

$R_3$ is lower alkyl unsubstituted or substituted, or an aralkyl group;

U is hydrogen or a non-ionic substituent;

$X^{(-)}$ is the equivalent of a colorless anion;

the moieties which occur twice in formula (11) being identical or different from one another.

14. A process as claimed in claim 1, wherein the dyestuff is a compound of the formula (12) or (13):

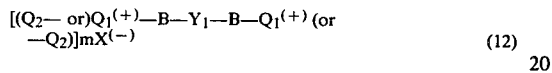
(12)

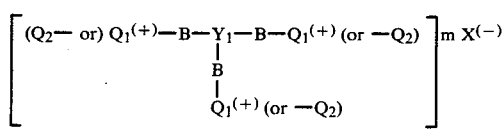
(13)

in which

B is a bivalent aliphatic bridge member which is alkylene of from 1 to 6 carbon atoms or lower alkenylene;

$Q_1^{(+)}$ is a cationic quaternary ammonium group, a hydrazonium group or a cyclammonium group as a constituent of a mesomeric 5-membered or 6-membered cationic nitrogenous ring system;

$Q_2$ is an uncharged, basic moiety which is a primary, secondary or tertiary amino group linked nonannularly or as a constituent of a mesomeric 5- membered or 6-membered uncharged nitrogenous ring system, or is an amidino, guanidino or hydrazino group;

$X^{(-)}$ is the equivalent of a colorless anion;

the moieties which each occur twice in formula (11) being identical or different from one another;

$Y_1$ is the radical of a dye chromophore based on a copper phthalocyanine, anthraquinone or triphenylmethane compound; and m represents 0, 1, 2 or 3;

the moieties which each occur several times in the formulae (12) and (13) being identical or different from one another.

15. A process as claimed in claim 1, which further comprises treating the undyed span product with a mixture of two or more of said dyestuffs.

16. A dyed fiber or fiber material produced by a process as claimed in claim 1.

17. A process as claimed in claim 1, wherein the dyestuff contains in the chromophore:

(a) two or three quaternary ammonium or cyclammonium groups, or (b) one quaternary ammonium or cyclammonium group, and in addition one or two aliphatically linked primary, secondary or tertiary amino, guanidino, amidino or hydrazino groups, or (c) two or three aliphatically linked primary, secondary or tertiary amino, guanidino, amidino or hydrazino groups, the basic groupings specified under (a), (b) and (c) being identical or different.

18. A process as claimed in claim 17, wherein the basic type dyestuff used is a dye of the formula

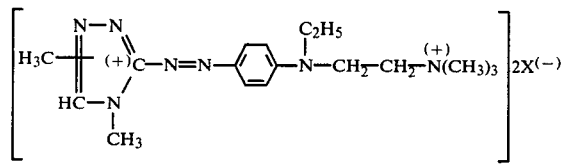

in which $X^{(-)}$ is the equivalent of an anion.

19. A process as claimed in claim 18, wherein $X^{(-)}$ is the methosulfate anion.

* * * * *